Y. TAMAKI.
METAL TREAD ATTACHMENT FOR TIRES.
APPLICATION FILED JAN. 20, 1917.
1,257,763.
Patented Feb. 26, 1918.
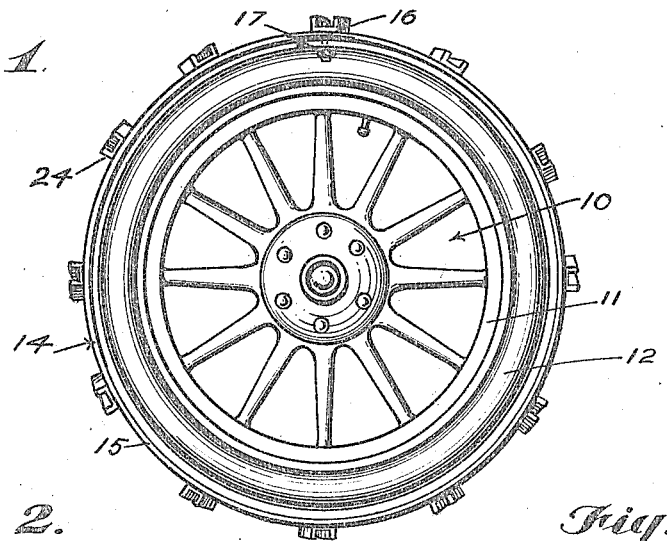
Fig. 1.
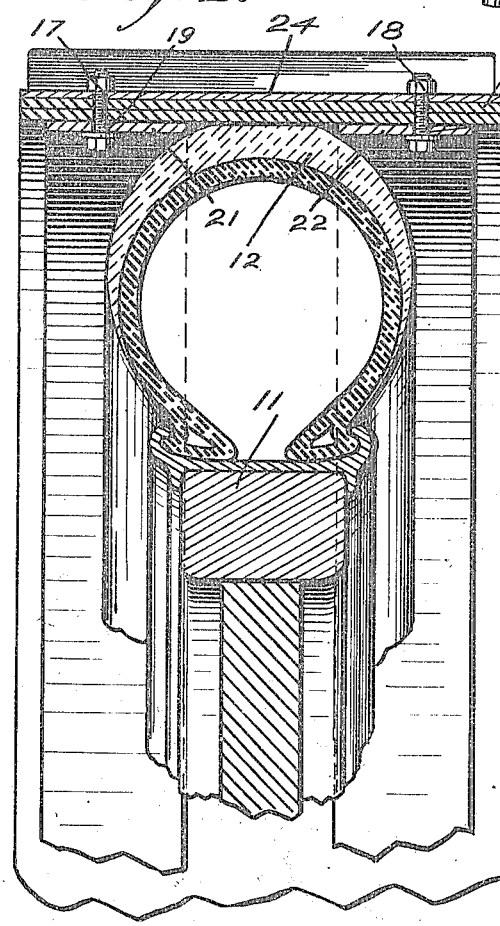
Fig. 2.
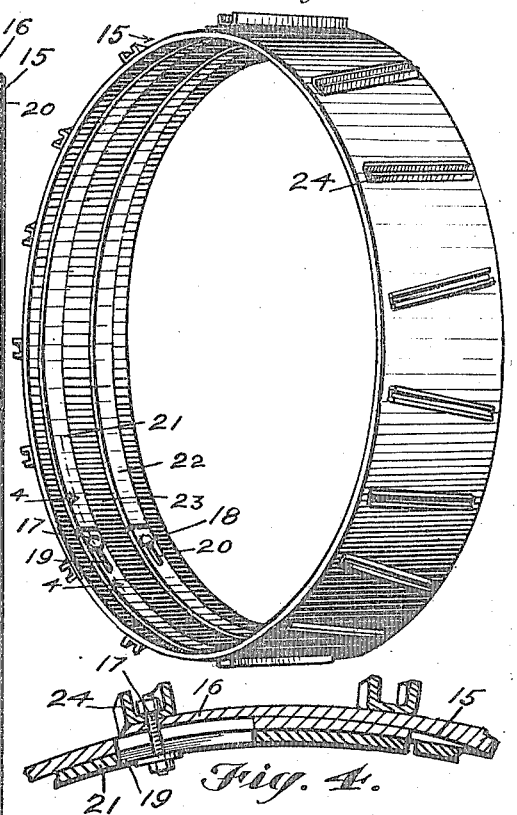
Fig. 3.
Fig. 4.
INVENTOR
Yosi Tamaki
by Hazard & Miller
ATTYS.

UNITED STATES PATENT OFFICE.

YOSI TAMAKI, OF LOS ANGELES, CALIFORNIA.

METAL TREAD ATTACHMENT FOR TIRES.

1,257,763. Specification of Letters Patent. Patented Feb. 26, 1918.

Application filed January 20, 1917. Serial No. 143,509.

*To all whom it may concern:*

Be it known that I, YOSI TAMAKI, a subject of the Emperor of Japan, residing at Los Angeles, in the county of Los Angeles and State of California, have invented new and useful Improvements in Metal Tread Attachments for Tires, of which the following is a specification.

This invention relates to a traction wheel for motor vehicles and particularly pertains to a detachable tractor tire.

It is the principal object of this invention to provide a detachable tractor tire for use in connection with pneumatic tires of motor vehicle wheels and the like, thus permitting a vehicle equipped with pneumatic tires to be readily adapted for heavy hauling and provided with additional tractive surface and grips by which the wheels will more readily cling to the road-bed.

Another object of this invention is to provide auxiliary traction tires which may be readily adapted for use upon pneumatic tires and which are so constructed as to require but slight adjustment in order to rigidly secure them in place.

It is a further object of this invention to provide a traction tread which is simple in construction, may be easily manufactured, and is formed of parts of simple design.

Other objects will appear hereinafter.

The invention is illustrated, by way of example, in the accompanying drawings in which:

Figure 1 is a view in side elevation illustrating a wheel and pneumatic tire as equipped with the detachable tractor tread.

Fig. 2 is an enlarged view in transverse section illustrating the construction of the tractor tread and its manner of mounting upon a pneumatic tire.

Fig. 3 is a view in perspective illustrating the tractor tread as disassociated from the wheel.

Fig. 4 is a view in longitudinal section as seen along the line 4—4 of Fig. 3 and illustrates the adjustable joint of the tractor tread.

Referring more particularly to the drawings, 10 indicates a wheel, here shown as of the artillery type. This wheel is fitted with an annular felly 11 upon which is suitably mounted a pneumatic tire 12. The pneumatic tire is of common construction and is adapted to bear upon the road-way under ordinary circumstances. However, when additional traction is desired, a demountable tractor tread 14 is positioned over the tire and around the wheel.

The tractor tread is formed with an annular transversely flat band 15. This member is constructed of a single sheet of metal which extends entirely around the tire and is formed with its contiguous ends slidingly overlapping so that the device may be adjusted to worn tires. The overlapping end portion 16 is formed upon one end of the band 15 and is disposed to overlap the other end of the band along its outer face. Clamping bolts 17 and 18 are secured to this overlapping end portion and extend through slotted openings 19 and 20 in the underlapping end of the band. These bolts are provided with nuts which insure that the ends of the band will be rigidly clamped in any adjusted position. Fixed within the band and spaced a proper distance from each other are tire rings 21 and 22. These rings are adapted to lie parallel and provide an annular channel 23 within which the tread of the pneumatic tire 12 will become embedded in a manner to prevent the removal of the tractor tread from the wheel when in operation. The bolts 17 and 18 also pass through slots in the rings 21 and 22. In order to increase the traction of the attachment a series of cleats 24 is disposed around the outer periphery of the tire band. These cleats are here shown as channel-section and as mounted at various angles to each other.

When a vehicle requires additional traction over that normally provided by its pneumatic tires, the tractor treads 14 are mounted upon the tires, as shown in Fig. 1 of the drawings. This is done by slightly deflating the tires to permit the band 15 to pass over the outer periphery thereof, after which the tire is re-inflated and its tread portion caused to be distended and become seated within the channel 23 between the rings 21 and 22. When the band is in proper position upon the tire, the bolts 17 and 18 are locked in a manner to hold the attachment rigidly and prevent its creeping when the wheel rotates. It is evident that during the rotation of the wheel the cleats 24 will engage the soil over which the vehicle is passing and will provide additional tractive effort.

It will thus be seen that the tractor tread here disclosed is simple in its construction and may be readily mounted in position and removed therefrom.

While I have shown the preferred construction of my tractor tread as now known to me, it will be understood that various changes in the combination, construction, and arrangement of parts may be made by those skilled in the art without departing from the spirit of my invention.

I claim:

In a metal tread attachment for tires, the combination with a pneumatic tire, of an annular flat tire band circumscribing the periphery of the tire and extending outwardly at opposite sides of the tire to form a wide tread surface of greater width than the width of the tire; the ends of said band overlapping each other; and clamping bolts secured through the outer overlapping end of the band and extending inwardly through circumferentially arranged slots formed through the inner overlapping end of the band, whereby the circumferential length of the band may be adjustably determined.

In testimony whereof I have signed my name to this specification.

YOSI TAMAKI.